United States Patent
Jang et al.

(10) Patent No.: US 9,221,706 B2
(45) Date of Patent: Dec. 29, 2015

(54) APPARATUS FOR FORMING A GLASS

(71) Applicant: Samsung Display Co., Ltd., Yongin, Gyeonggi-do (KR)

(72) Inventors: Jin-Seok Jang, Asan-si (KR);
Jong-Hwan Kim, Seoul (KR);
Kwan-Young Han, Seongnam-si (KR);
Seong-Jin Hwang, Suwon-si (KR);
Jae-Seung Jeon, Cheonan-si (KR);
Dae-Sik Hong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/201,763

(22) Filed: Mar. 7, 2014

(65) Prior Publication Data

US 2015/0000339 A1      Jan. 1, 2015

(30) Foreign Application Priority Data

Jun. 28, 2013    (KR) .......................... 10-2013-0075087

(51) Int. Cl.
*C03B 23/03*     (2006.01)

(52) U.S. Cl.
CPC ............. *C03B 23/03* (2013.01); *C03B 23/0305* (2013.01)

(58) Field of Classification Search
USPC .................................................. 65/106, 291
IPC ...................................................... C03B 23/03
See application file for complete search history.

(56) References Cited

U.S. PATENT DOCUMENTS

| | | | |
|---|---|---|---|
| 3,847,586 A * | 11/1974 | Reese et al. ...................... 65/290 |
| 4,361,429 A * | 11/1982 | Anderson et al. ................. 65/67 |
| 4,606,749 A * | 8/1986 | Nushi et al. ...................... 65/106 |
| 4,741,751 A * | 5/1988 | Claassen et al. ................. 65/106 |
| 5,318,615 A * | 6/1994 | Nagai et al. ...................... 65/104 |
| 5,656,055 A * | 8/1997 | Frank et al. ...................... 65/287 |
| 5,695,537 A * | 12/1997 | Sykes .............................. 65/106 |
| 2005/0235698 A1* | 10/2005 | Siskos ............................. 65/106 |
| 2006/0130526 A1* | 6/2006 | Yli-Vakkuri et al. ........... 65/246 |
| 2010/0129602 A1* | 5/2010 | Dejneka ......................... 428/130 |
| 2015/0000340 A1* | 1/2015 | Jang et al. ....................... 65/106 |

FOREIGN PATENT DOCUMENTS

| | | |
|---|---|---|
| JP | 2005-263585 A | 9/2005 |
| KR | 10-2011-0096455 A | 8/2011 |

* cited by examiner

*Primary Examiner* — Mark Halpern
(74) *Attorney, Agent, or Firm* — Christie, Parker & Hale, LLP

(57) ABSTRACT

An apparatus for forming a glass, the apparatus including a lower mold and an upper mold is disclosed. The lower mold may be configured to support a central portion of a lower surface of the glass. The upper mold may be configured to make point contact with an edge portion of an upper surface of the glass. The upper mold may press the edge portion of the upper surface of the glass to form a rounded portion of the edge portion of the glass. An apparatus for forming a glass, the apparatus including: a lower mold configured to make point contact with an edge portion of a lower surface of the glass; and an upper mold configured to press an interior portion of the upper surface of the glass to form a rounded portion at the edge portion of the glass, is also disclosed.

10 Claims, 6 Drawing Sheets

APPARATUS FOR FORMING A GLASS

CROSS-REFERENCE TO RELATED APPLICATION

This application claims priority to and the benefit of Korean Patent Application No. 10-2013-0075087, filed on Jun. 28, 2013 in the Korean Intellectual Property Office, the entire content of which is incorporated herein by reference.

BACKGROUND

1. Field

Aspects according to embodiments of the present disclosure relate to an apparatus for forming a glass. More particularly, aspects according to embodiments of the present disclosure relate to an apparatus for forming a glass of a portable or mobile phone (e.g., a cellular phone).

2. Description of Related Art

Generally, a glass for a portable or mobile phone (e.g., a cellular phone) may include edges having a rounded shape. For example, the edges of the glass may be bent using a forming apparatus.

The edges of the glass may be bent (or formed) using a mold having a rounded portion corresponding to the rounded shape of the edges of the glass. Therefore, the edges of the glass may be formed through contact with an entire surface of the rounded portion of the mold.

However, when the glass has an uneven thickness, for example, due to a machining tolerance of the mold, a thickness tolerance of the glass, etc., a load (or pressure used to mold the glass) may be too concentrated on a thin portion of the glass that contacts the rounded portion of the mold. The concentrated load may result in scratches in the glass.

SUMMARY

Aspects according to embodiments of the present disclosure are directed to an apparatus for forming a glass that may be capable of preventing or reducing damage to the glass.

According to example embodiments of the present disclosure, there may be provided an apparatus for forming a glass. The apparatus may include a lower mold and an upper mold. The lower mold may be configured to support a central portion of a lower surface of the glass. The upper mold may make point contact with an edge portion of an upper surface of the glass. The upper mold may press the edge portion of the upper surface of the glass to form a rounded portion at the edge portion of the glass.

In example embodiments, the upper mold may include a supporting portion configured to support a central portion of the upper surface of the glass, and a pressing portion configured to press the edge portion of the upper surface of the glass.

In example embodiments, the pressing portion may have a lower surface protruding lower than a lower surface of the supporting portion.

In example embodiments, the pressing portion may be movably connected to the supporting portion along a vertical direction.

In example embodiments, the apparatus may further include a connecting rod between the pressing portion and the supporting portion, and an actuator for moving the connecting rod along the vertical direction.

In example embodiments, the pressing portion may include a receiving groove configured to receive the edge portion of the glass.

In example embodiments, the pressing portion may further include a fillet portion configured to define the receiving groove. The fillet portion may make point contact with the edge portion of the glass.

In example embodiments, the lower mold may have a forming portion having a curvature corresponding to a curvature of the rounded portion to be formed in the glass.

According to example embodiments, there may be provided an apparatus for forming a glass. The apparatus may include a lower mold and an upper mold. The lower mold may make point contact with an edge portion of a lower surface of the glass. The upper mold may press a central portion of an upper surface of the glass to form a rounded portion at the edge portion of the glass.

In example embodiments, the upper mold may have a forming portion having a curvature corresponding to a curvature of the rounded portion to be formed in the glass.

In example embodiments, the upper mold may include a pressing portion configured to press the central portion of the upper surface of the glass.

In example embodiments, the lower mold may further include a receiving portion configured to receive the central portion of the glass pressed by the upper mold, and a supporting portion protruding from a side of the receiving portion in a vertical direction to make contact with the edge portion of the glass.

In example embodiments, the supporting portion may include a receiving groove configured to receive the edge portion of the glass.

In example embodiments, the supporting portion may include a fillet portion configured to define the receiving groove. The fillet portion may make point contact with the edge portion of the glass.

A method of forming a glass, the method including: placing the glass between a lower mold and an upper mold; and pressing the glass to make point contact between an edge portion of the glass and the lower mold or the upper mold to form a rounded portion at the edge portion of the glass.

In example embodiments, the pressing of the glass includes: supporting a central portion of a lower surface of the glass with the lower mold, and making point contact between the upper mold and the edge portion of an upper surface of the glass to press the edge portion of the upper surface of the glass to form the rounded portion at the edge portion of the glass.

In example embodiments, the pressing of the glass includes: supporting a central portion of the upper surface of the glass at a supporting portion of the upper mold; and pressing the edge portion of the upper surface of the glass with a pressing portion of the upper mold.

In example embodiments, the pressing portion has a lower surface protruding lower than a lower surface of the supporting portion.

In example embodiments, the pressing of the glass includes: making point contact between the lower mold and the edge portion of a lower surface of the glass; and pressing a central portion of an upper surface of the glass with the upper mold to form the rounded portion at the edge portion of the glass.

In example embodiments, the pressing of the glass includes forming the rounded portion of the edge portion of the glass at a forming portion of the upper mold, the forming portion having a curvature corresponding to a curvature of the rounded portion to be formed in the glass.

According to example embodiments, the upper mold or the lower mold may make point contact with the edge portion of the glass to form the bent portion of the edge portion of the glass. For example, although a thickness tolerance of the glass or a machining tolerance of the upper mold may be generated, a load may not be concentrated on a thin portion of the glass. As a result, damages such as scratches may not be generated on the glass.

BRIEF DESCRIPTION OF THE DRAWINGS

Example embodiments of the present disclosure will be more clearly understood from the following detailed description taken in conjunction with the accompanying drawings, which serve to explain principles of the present disclosure.

FIG. 1 is a cross-sectional view of an apparatus for forming a glass in accordance with example embodiments;

FIGS. 2 to 4 are cross-sectional views illustrating a process of forming the glass using the apparatus of FIG. 1;

FIG. 5 is a cross-sectional view of an apparatus for forming a glass in accordance with other example embodiments;

FIGS. 6 to 8 are cross-sectional views illustrating a process of forming the glass using the apparatus of FIG. 5;

FIG. 9 is a cross-sectional view of an apparatus for forming a glass in accordance with still other example embodiments; and FIGS. 10 to 12 are cross-sectional views illustrating a process of forming the glass using the apparatus of FIG. 9.

DETAILED DESCRIPTION

Figure 1:
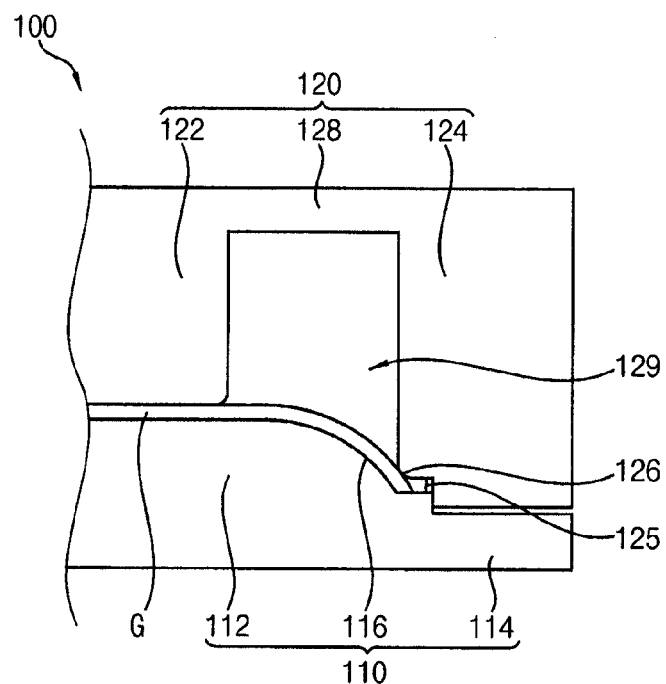
FIGS. 1 to 12 represent non-limiting embodiments as described herein.

Various embodiments of the present disclosure will be described more fully hereinafter with reference to the accompanying drawings, in which some embodiments are shown, by way of illustration. The invention may, however, be embodied in many different forms and should not be construed as being limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected to or coupled to the other element or layer, or it can be indirectly on, connected to or coupled to the other element or layer with one or more intervening elements or layers interposed therebetween. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by the terms first, second, third, and the like. These terms are only used to distinguish one element, component, region, layer or section from another element, component, region, layer or section. Thus, a first element, component, region, layer or section discussed below could be a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing the embodiments presented herein only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof.

Embodiments of the present disclosure are described herein with reference to drawings that include cross-sectional views that are schematic illustrations of idealized embodiments (and intermediate structures). As such, variations from the shapes illustrated in the drawings as a result of, for example, variations in manufacturing techniques and/or tolerances, are to be expected. Thus, the embodiments described herein should not be construed as being limited to the particular shapes of regions of the embodiments illustrated herein, but, on the contrary, are to include deviations in shapes that result from, for example, the effects of manufacturing. Indeed, the regions of the embodiments illustrated in the figures are schematic in nature and their shapes may not illustrate the actual shape of a region of a device and are not intended to limit the scope of the invention.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating an apparatus for forming a glass in accordance with example embodiments of the present disclosure.

Referring to FIG. 1, an apparatus 100 for forming a glass in accordance with this example embodiment may include a lower mold 110 and an upper mold 120.

According to example embodiments of the apparatus, the lower mold 110 may be configured to support a glass G. The lower mold 110 may include a first supporting portion 112 and a second supporting portion 114. The first supporting portion 112 may correspond to a central portion (e.g., an inner or interior portion) of the lower mold 110. The second supporting portion 114 may correspond to an edge portion (e.g., an outer portion) of the lower mold 110.

The first supporting portion 112 may protrude upwardly from the second supporting portion 114. The first supporting portion 112 may have a flat upper surface. The flat upper surface of the first supporting portion 112 may be configured to support a central portion (e.g., an inner or interior portion) of a lower surface of the glass G.

The second supporting portion 114 may be positioned lower than the first supporting portion 112. The second supporting portion 114 may have a flat upper surface. The flat upper surface of the second supporting portion 114 may make contact with (e.g., physically contact) the upper mold 120 when the upper mold 120 downwardly presses an edge portion of the glass G.

The lower mold 110 may include a forming portion 116 connected between the first supporting portion 112 and the second supporting portion 114. The forming portion 116 may make contact with (e.g., physically contact) the edge portion of the glass G, when pressed by the upper mold 120, to form a downwardly rounded portion at the edge portion of the glass G. For example, the forming portion 116 may have a curvature corresponding to a curvature formed at the downwardly rounded portion of the glass G. In some embodiments, the curvature of the forming portion 116 is determined (or set) in accordance with a design curvature of the downwardly rounded portion of the glass G (e.g., a desired curvature to be formed in the glass G).

The upper mold 120 may be configured to downwardly press the glass G, which may be supported by the lower mold 110, to form the downwardly rounded portion at the edge portion of the glass G. In example embodiments of the apparatus, the upper mold 120 may include a supporting portion 122, a pressing portion 124 and a connecting portion 128.

The supporting portion 122 may correspond to a central portion (e.g., an inner or interior portion) of the upper mold 120. The supporting portion 122 may have a flat lower surface configured to support (or apply pressure to) an interior portion (e.g., a central portion) of an upper surface of the glass G. For example, the supporting portion 122 may firmly support the central portion of the glass G together with the first supporting portion 112 of the lower mold 110.

The connecting portion 128 may be connected between the supporting portion 122 and the pressing portion 124. The connecting portion 128 may include a groove (or opening) 129 corresponding to a portion of the upper surface of the glass G. For example, the groove 129 may be configured to expose (or leave a space adjacent to) a portion of the upper surface of the glass G, even when the glass G is pressed by the upper mold 120. An outer surface of the supporting portion 122 and an inner surface of the pressing portion 124 may be exposed (or adjacent) to the groove 129.

The pressing portion 124 may correspond to an edge portion of the upper mold 120. The pressing portion 124 may make point contact (e.g., localized contact) with the edge portion of the upper surface of the glass G to press the edge portion of the glass G to make contact with (e.g., physically contact) the forming portion 116. As a result, the downwardly rounded portion may be formed at the edge portion of the glass G. Although embodiments of the present disclosure are described herein with reference to drawings that include cross-sectional views, the contact between the various components of the apparatus may extend in three dimensions. For example, in each of the embodiments disclosed herein, the point contact between the pressing portion and the glass G may extend along a line transverse (e.g., perpendicular) to the cross-sectional views shown in the drawings. In each of the embodiments of the present disclosure, the point contact is not limited to contact at a single point or line.

In example embodiments, when the supporting portion 122 makes contact with the central portion of the upper surface of the glass G, a lower surface of the pressing portion 124 may be placed lower than a lower surface of the supporting portion 122 to allow the pressing portion 124 to press the edge portion of the upper surface of the glass G downward to form the downwardly rounded portion of the glass G. For example, the lower surface of the pressing portion 124 may be flat and may protrude downwardly lower than the lower surface of the supporting portion 122. Further, when the supporting portion 122 makes contact with the central portion of the upper surface of the glass G, the lower surface of the pressing portion 124 may make contact with the upper surface of the second supporting portion 114.

In example embodiments, the pressing portion 124 may include a receiving groove 125 configured to receive the edge portion of the glass G. The receiving groove 125 may be formed at a lower end of an inner surface of the pressing portion 124. Because the edge portion of the glass G received in the receiving groove 125 may be firmly supported, the edge portion of the glass G may be firmly supported when pressed by the pressing portion 124.

In example embodiments, the pressing portion 124 may include a fillet portion 126 configured to define the receiving groove 125 and make point contact with the edge portion of the glass G. A portion of the pressing portion making point contact with the edge portion of the glass G may correspond to an inner end of an upper surface of the receiving groove 125. For example, the fillet portion 126 may be formed at the inner end of the upper surface of the receiving groove 125. The fillet portion may softly make point contact with the edge portion of the glass G to prevent scratches from being generated at the edge portion of the glass G (or to reduce the likelihood of such scratches being generated).

Figure 2:
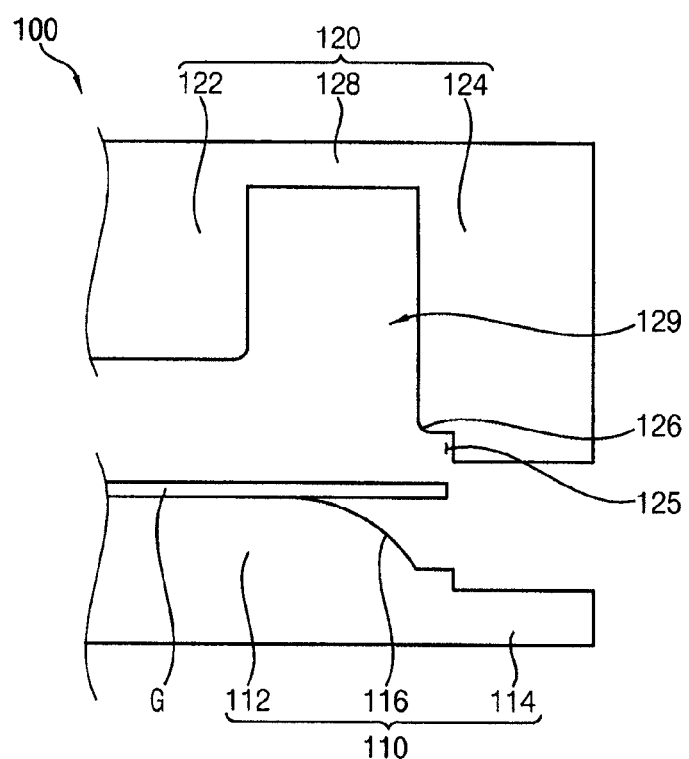
Figure 3:
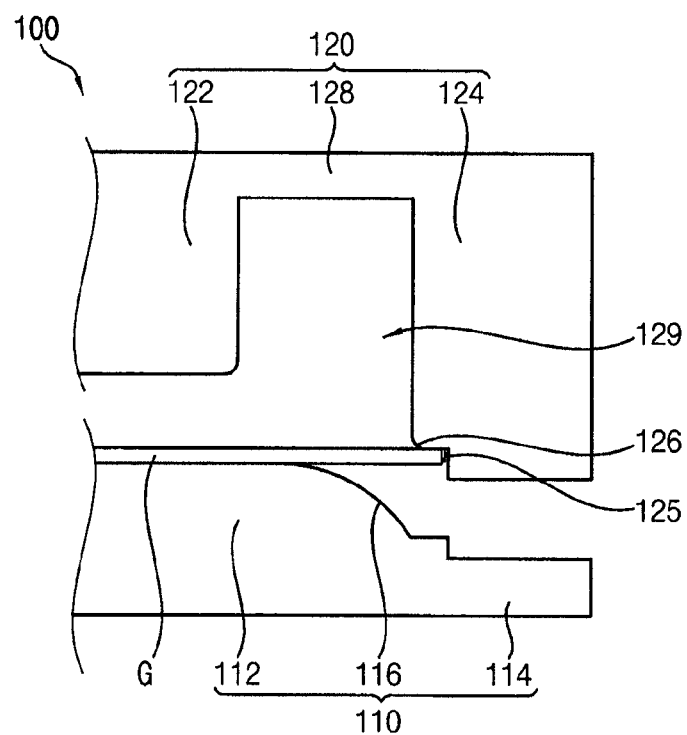
Figure 4:
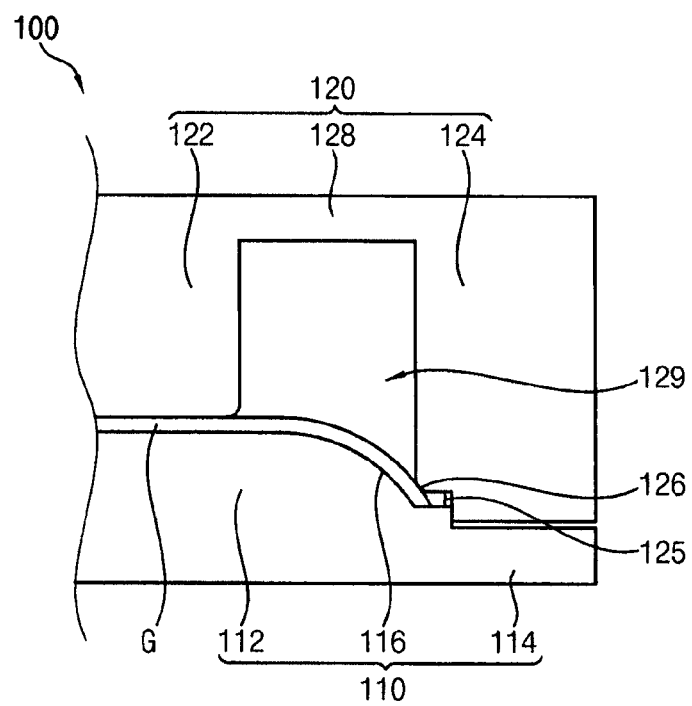

FIGS. 2 to 4 are cross-sectional views illustrating a process of forming the glass using the apparatus in FIG. 1.

Referring to FIG. 2, in a chamber where a high temperature may be maintained, the glass G may be placed on the upper surface of the first supporting portion 112 of the lower mold 110. The first supporting portion 112 may support the central portion of the lower surface of the glass G. For example, the edge portion of the glass G may protrude horizontally from the first supporting portion 112. The edge portion of the glass G may be positioned over or extend toward the second supporting portion 114.

Referring to FIG. 3, the upper mold 120 may be descended toward the glass G. Because the pressing portion 124 may be downwardly protruded from the supporting portion 122, the pressing portion 124 may make contact with the edge portion of the upper surface of the glass G before the supporting portion 122 makes contact with the interior portion of the upper surface of the glass G. For example, when the pressing portion 124 makes contact with the edge portion of the upper surface of the glass G, the supporting portion 122 may still be spaced apart from the central portion of the upper surface of the glass G. In example embodiments, the edge portion of the glass G may be received in the receiving groove 125. Further, the edge portion of the glass G may softly make point contact with the fillet portion 126.

Referring to FIG. 4, the pressing portion 124 may be downwardly descended until the supporting portion 122 contacts the central portion of the upper surface of the glass G. The pressing portion 124 may press the edge portion of the glass G until the edge portion of the glass G contacts the forming portion 116 of the lower mold 110. For example, the downwardly rounded portion having the curvature corresponding to the curvature of the forming portion 116 may be formed at the edge portion of the glass G.

In example embodiments, the pressing portion 124 may make point contact with the edge portion of the glass G to form the downwardly rounded portion of the glass G. For example, the edge portion of the glass G may softly make point contact with the fillet portion 126. Although the thickness tolerance of the glass G or the machining tolerance of the upper mold 120 may vary, scratches may not be generated at the rounded portion of the glass G (or the likelihood of scratches at the rounded portion of the glass G may be reduced).

Figure 5:
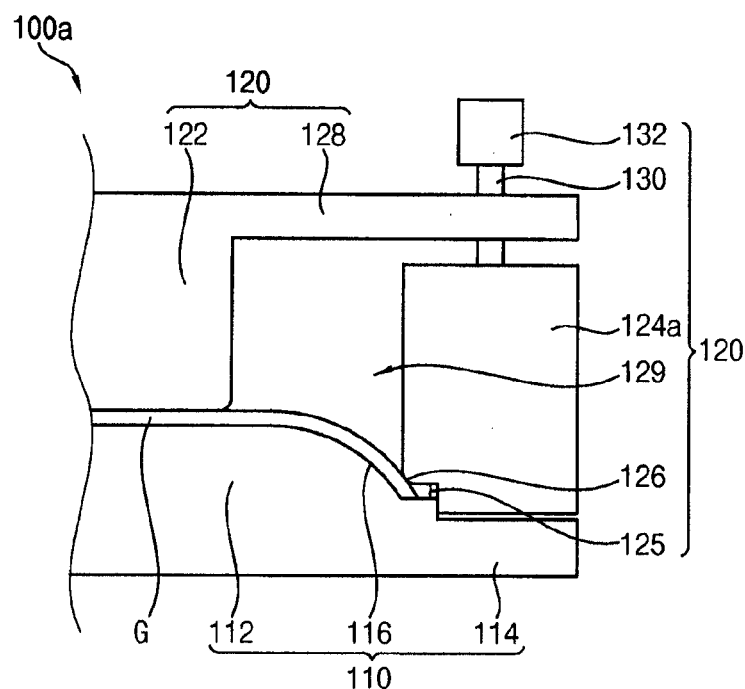

FIG. 5 is a cross-sectional view of an apparatus for forming a glass in accordance with other example embodiments.

Referring to FIG. 5, an apparatus 100a for forming a glass in accordance with this example embodiment may include a lower mold 110 and an upper mold 120. In example embodiments, the lower mold 110 may include elements substantially the same as those of the lower mold 110 in FIG. 1. The same reference numerals may refer to the same elements and any further illustrations with respect to those same elements may be omitted herein for brevity.

The upper mold 120 may press the glass G supported by the lower mold 110 to form the downwardly rounded portion at the edge portion of the glass G. In example embodiments, the upper mold 120 may include a supporting portion 122, a pressing portion 124a and a connecting portion 128.

The supporting portion 122 may correspond to the central portion of the upper mold 120. The supporting portion 122 may have the flat lower surface configured to support the central portion of the upper surface of the glass G as described above with respect to FIGS. 1-4. For example, the supporting portion 122 may firmly support the central portion of the glass G together with the first supporting portion 112 of the lower mold 110.

The connecting portion 128 may be connected between the supporting portion 122 and the pressing portion 124a. The connecting portion 128 may include the groove (or opening) 129 configured to expose (or leave a space adjacent to) the portion of the upper surface of the glass G, even when the glass G is pressed by the upper mold 120, as described above with respect to FIGS. 1-4. For example, the outer surface of the supporting portion 122 and the inner surface of the pressing portion 124a may be exposed (or adjacent) to the groove 129.

The pressing portion 124a may correspond to the edge portion of the upper mold 120. The pressing portion 124a may make point contact with the edge portion of the upper surface of the glass G so that the edge portion of the glass G may make contact with the forming portion 116 to form the downwardly rounded portion at the edge portion of the glass G.

In example embodiments, the pressing portion 124a may have a lower surface that is in a plane that is substantially parallel with a plane in which the lower surface of the supporting portion 122 lies. For example, when the supporting portion 122 makes contact with the central portion of the upper surface of the glass G, the pressing portion 124a may also make contact with the edge portion of the upper surface of the glass G.

In order to downwardly move (or descend) the pressing portion 124a to press the central portion of the upper surface of the glass G, the pressing portion 124a may be movably connected to the connecting portion 128 via a connecting rod 130 along a vertical direction. The connecting rod 130 may include a lower end fixed to the pressing portion 124a, and an upper end movably inserted into the connecting portion 128. The upper end of the connecting rod 130 may protrude from the upper surface of the connecting portion 128.

An actuator 132 may be connected to the upper end of the connecting rod 130. The actuator 132 may descend (or move) the connecting rod 130 so that the pressing portion 124a may move and press the edge portion of the glass G to contact the edge portion of the glass G with the forming portion 116 of the lower mold 110. In example embodiments, the actuator 132 may include a motor, a cylinder, and the like.

In example embodiments, the pressing portion 124a may include a receiving groove 125 configured to receive the edge portion of the glass G. The receiving groove 125 may be formed at the lower end of the inner surface of the pressing portion 124a. Because the edge portion of the glass G received in the receiving groove 125 may be firmly supported, the edge portion of the glass G may be firmly supported when pressed by the pressing portion 124a.

In example embodiments, the pressing portion 124a may include the fillet portion 126 configured to define the receiving groove 125 and make point contact (e.g., localized contact) with the edge portion of the glass G. A portion of the pressing portion making point contact with the edge portion of the glass G may correspond to the inner end of the upper surface of the receiving groove 125. For example, the fillet portion 126 may be formed at the inner end of the upper surface of the receiving groove 125. The fillet portion may softly make point contact with the edge portion of the glass G to prevent scratches from being generated at the edge portion of the glass G (or reduce the likelihood of such scratches being generated).

Figure 6:
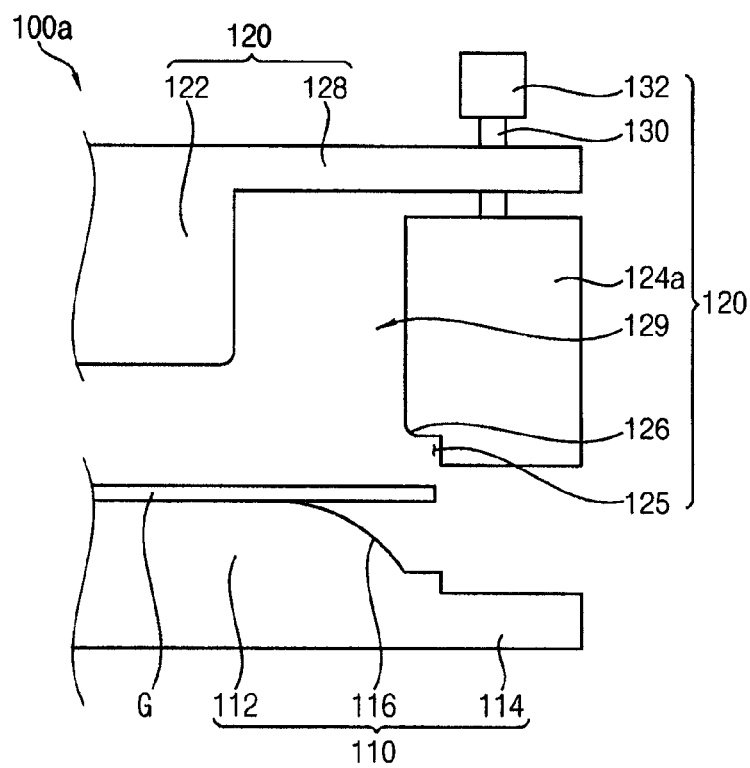
Figure 7:
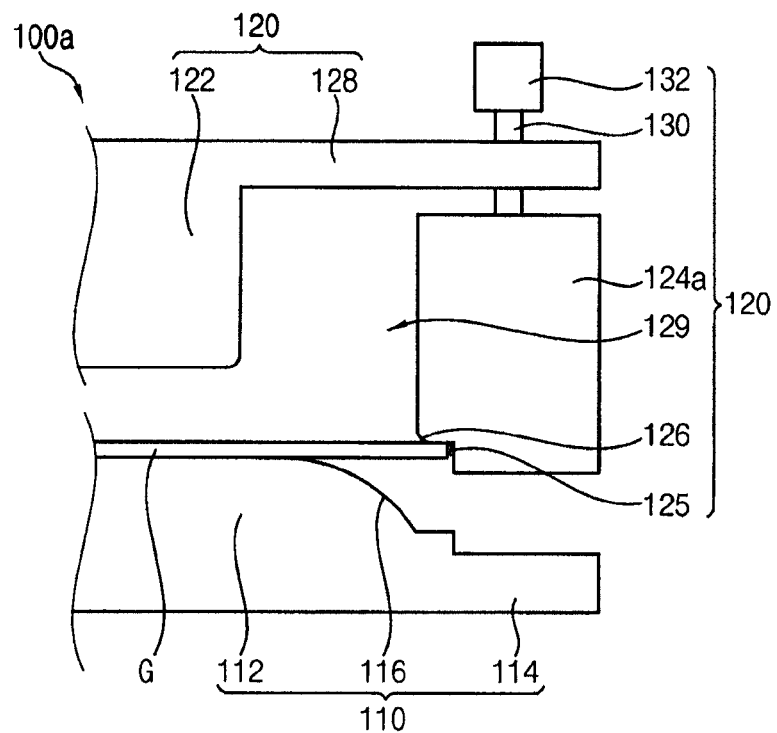
Figure 8:
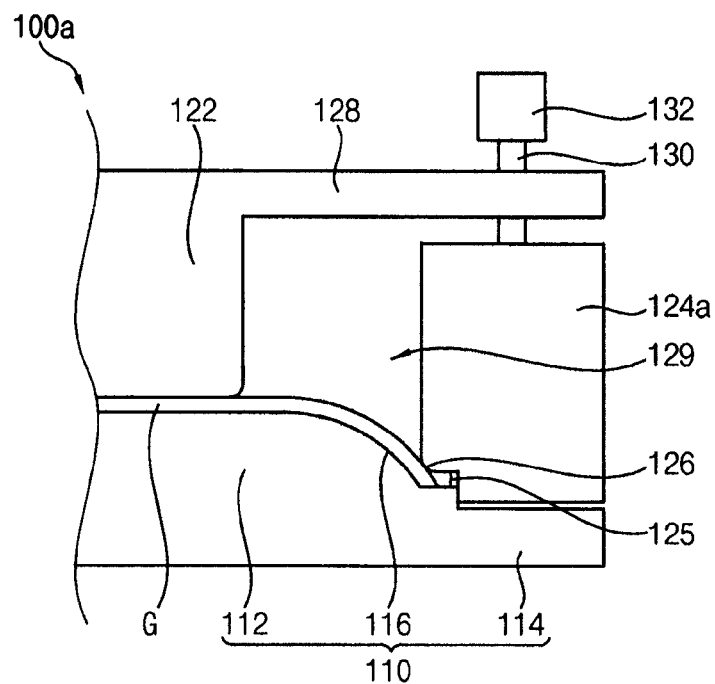

FIGS. 6 to 8 are cross-sectional views illustrating a process of forming the glass using the apparatus in FIG. 5.

Referring to FIG. 6, in the chamber where the high temperature may be maintained, the glass G may be placed on the upper surface of the first supporting portion 112 of the lower mold 110. The first supporting portion 112 may support the central portion of the lower surface of the glass G. For example, the edge portion of the glass G may protrude horizontally from the first supporting portion 112. The edge portion of the glass G may be positioned over or extend toward the second supporting portion 114.

Referring to FIG. 7, the upper mold 120 may be descended toward the glass G. The supporting portion 122 and the pressing portion 124a may make contact with the upper surface of the glass G. In example embodiments, the edge portion of the glass G may be received in the receiving groove 125. Further, the edge portion of the glass G may softly make point contact with the fillet portion 126.

Referring to FIG. 8, the actuator 132 may descend the connecting rod 130. The pressing portion 124a may press the edge portion of the upper surface glass G until the edge portion of the glass G may make contact with the forming portion 116 of the lower mold 110. For example, the downwardly rounded portion having the curvature corresponding to the curvature of the forming portion 116 may be formed at the edge portion of the glass G.

Figure 9:
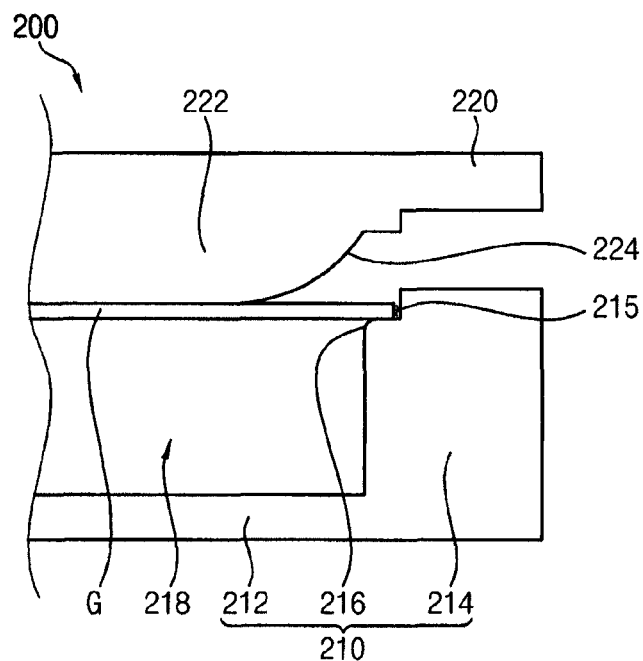

FIG. 9 is a cross-sectional view of an apparatus for forming a glass in accordance with still other example embodiments.

Referring to FIG. 9, an apparatus 200 for forming a glass in accordance with this example embodiment may include a lower mold 210 and an upper mold 220.

The lower mold 210 may include a receiving portion 212 and a supporting portion 214. The receiving portion 212 may correspond to a central portion (e.g., an inner or interior portion) of the lower mold 210. The supporting portion 214 may correspond to an edge portion of the lower mold 210.

The supporting portion 214 may protrude upwardly from a side surface of the receiving portion 212. For example, a space 218 configured to receive the central portion of the glass G may be over the receiving portion 212.

The supporting portion 214 may be configured to support the edge portion of the glass G. In example embodiments, the supporting portion 214 may include a receiving groove 215 configured to receive the edge portion of the glass G. The receiving groove 215 may be formed at an upper end of an inner surface of the supporting portion 214. The supporting portion 214 may firmly support the edge portion of the glass G by receiving the edge portion of the glass G in the receiving groove 215.

Further, the supporting portion 214 may include a fillet portion 216 configured to define the receiving groove 215 and make point contact with the edge portion of the glass G. A portion of the supporting portion making point contact with the edge portion of the glass G may correspond to an upper end of a side surface adjacent to the space 218. For example, the fillet portion 216 may be formed at the upper end of the side surface adjacent to the space 218. The fillet portion 216 may softly make point contact with the edge portion of the glass G to prevent scratches from being generated at the edge portion of the glass G (or reduce the likelihood of such scratches being generated).

The upper mold 220 may press the central portion of the upper surface of the glass G. Because the supporting portion 214 may firmly support the edge portion of the glass G, the upper mold 220 may press the central portion of the upper surface of the glass G to form an upwardly rounded portion at the edge of the glass G.

In example embodiments, the upper mold 220 may include a pressing portion 222 configured to press the central portion of the upper surface of the glass G. Further, the upper mold 220 may include a forming portion 224 extended from the pressing portion 222. The pressing portion 222 may press the central portion of the upper surface of the glass G to contact the forming portion 224 with the edge portion of the glass G, thereby forming the upwardly rounded portion at the edge portion of the glass G. For example, the forming portion 224 may have a curvature corresponding to a curvature formed at the upwardly rounded portion of the glass G. In some embodiments, the curvature of the forming portion 224 is determined (or set) in accordance with a design curvature of the upwardly rounded portion of the glass G (e.g., a desired curvature to be formed in the glass G).

Figure 10:
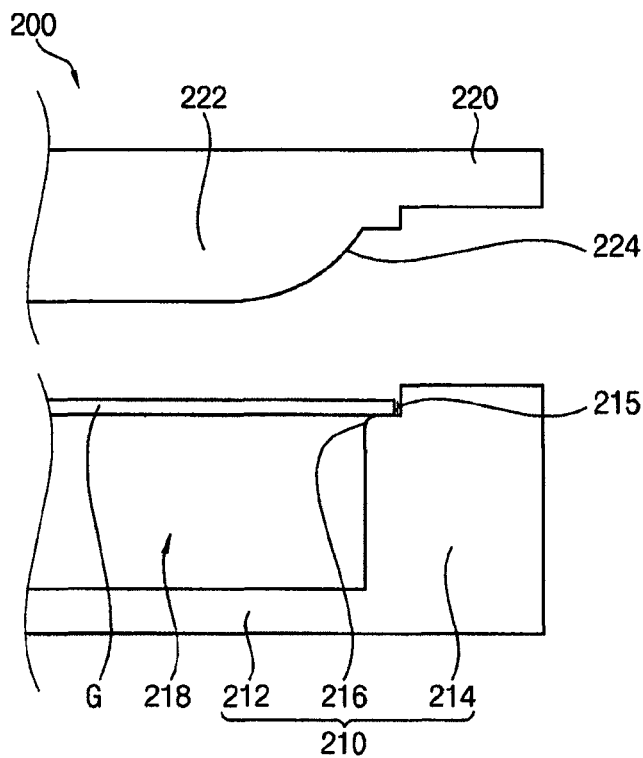
Figure 11:
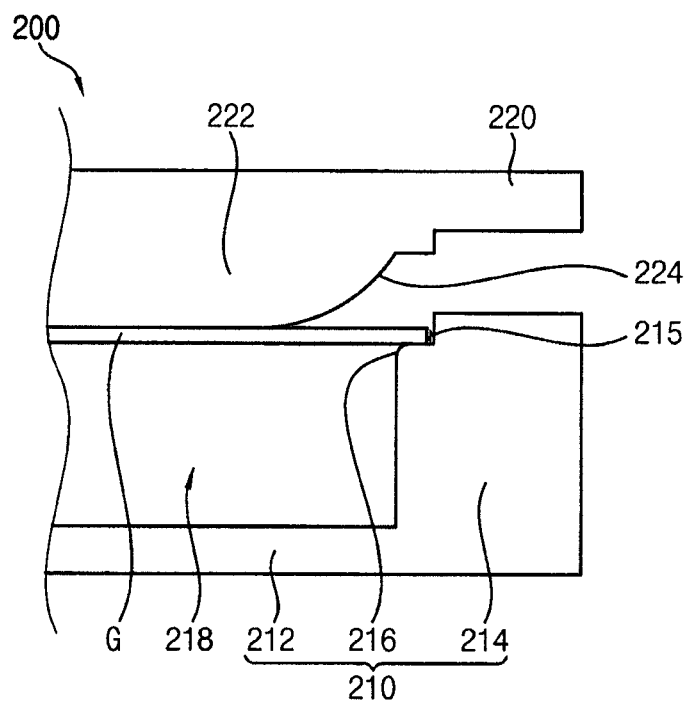
Figure 12:
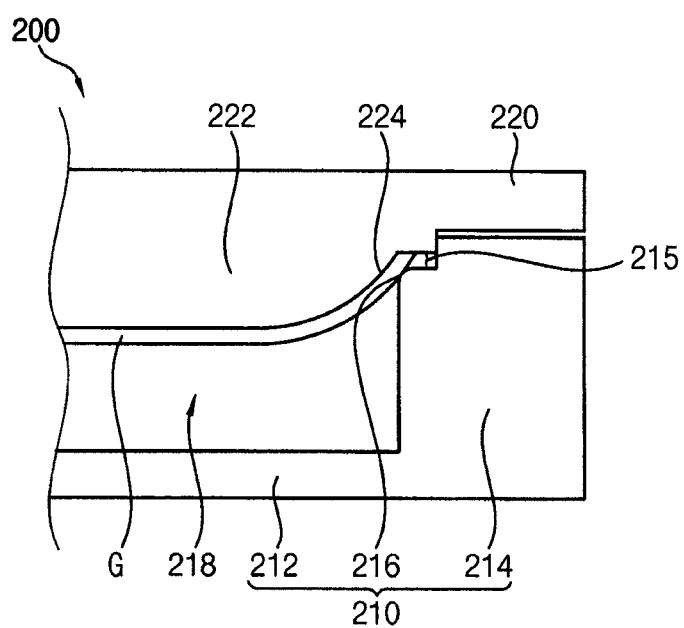

FIGS. 10 to 12 are cross-sectional views illustrating a process of forming the glass using the apparatus in FIG. 9.

Referring to FIG. 10, the glass G may be placed on the lower mold 210 in a high temperature chamber. The edge portion of the glass G may be received in the receiving groove 215. The edge portion of the glass G may softly make point contact with the fillet portion 216.

Referring to FIG. 11, the upper mold 220 may be descended toward the glass G. The supporting portion 222 may make contact with the central portion of the upper surface of the glass G.

Referring to FIG. 12, when the upper mold 220 is continuously descended, the pressing portion 222 may press the central portion of the glass G. Because the edge portion of the glass G may be supported by the supporting portion 214, the edge portion of the glass G may be bent to be upwardly bent. The upwardly bent portion of the glass G may make contact with the forming portion 224 of the upper mold 220. For example, the upwardly rounded portion may be formed at the edge portion of the glass G.

According to example embodiments, the upper mold or the lower mold may make point contact with the edge portion of the glass to form a bent (e.g., rounded) portion of the edge portion of the glass. Although a thickness tolerance of the glass or a machining tolerance of the upper mold may vary, a load (e.g., a pressure) may not be concentrated at a thin portion of the glass. As a result, damage to the glass, such as scratches, may be avoided (or the likelihood of damage to the glass is reduced).

The foregoing is illustrative of embodiments of the subject matter disclosed and is not to be construed as limiting thereof. Although a few embodiments have been described, those skilled in the art will readily appreciate that many modifications are possible in the disclosed embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and the present invention is not to be construed as being limited to the specific embodiments disclosed, and that modifications to the disclosed embodiments, as well as other embodiments, are intended to be included within the scope of the appended claims, and equivalents thereof.

What is claimed is:

1. An apparatus for forming a glass, the apparatus comprising:
   a lower mold configured to support a central portion of a lower surface of the glass; and
   an upper mold facing the lower mold and configured to make point contact with an edge portion of an upper surface of the glass and to press the edge portion of the upper surface of the glass to form a rounded portion at the edge portion of the glass; the upper mold further comprising:
   a supporting portion configured to support a central portion of the upper surface of the glass; and
   a pressing portion spaced apart from the supporting portion and configured to press the edge portion of the upper surface of the glass, wherein the pressing portion has a lower surface protruding lower than a lower surface of the supporting portion.

2. The apparatus of claim 1, wherein the pressing portion is movably connected to the supporting portion along a vertical direction.

3. The apparatus of claim 2, further comprising:
   a connecting rod connected between the pressing portion and the supporting portion; and
   an actuator for moving the connecting rod along the vertical direction.

4. The apparatus of claim 1, wherein the pressing portion comprises a receiving groove configured to receive the edge portion of the glass.

5. The apparatus of claim 4, wherein the pressing portion further comprises a fillet portion configured to define the receiving groove and make point contact with the edge portion of the glass.

6. The apparatus of claim 1, wherein the lower mold has a forming portion, and the forming portion has a curvature corresponding to a curvature of the rounded portion to be formed in the glass.

7. An apparatus for forming a glass, the apparatus comprising:
   a lower mold configured to make point contact with an edge portion of a lower surface of the glass, wherein the lower mold further comprises:
   a receiving portion configured to receive a central portion of the glass pressed by an upper mold; and
   a supporting portion protruding from a side of the receiving portion in a vertical direction to make point contact with the edge portion of the glass, wherein the supporting portion comprises a receiving groove configured to receive the edge portion of the glass; and an upper mold facing the lower mold and configured to press a central portion of an upper surface of the glass to form a rounded portion at the edge portion of the glass.

8. The apparatus of claim 7, wherein the upper mold comprises a forming portion, and the forming portion has a curvature corresponding to a curvature of the rounded portion to be formed in the glass.

9. The apparatus of claim 7, wherein the upper mold comprises a pressing portion configured to press the central portion of the upper surface of the glass.

10. The apparatus of claim 7, wherein the supporting portion comprises a fillet portion configured to define the receiving groove and make point contact with the edge portion of the glass.

* * * * *